(12) United States Patent
Roberts

(10) Patent No.: US 9,994,105 B2
(45) Date of Patent: Jun. 12, 2018

(54) WORKING MACHINE

(71) Applicant: J. C. Bamford Excavators Limited, Uttoxeter, Staffordshire (GB)

(72) Inventor: Nicholas Roberts, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 14 days.

(21) Appl. No.: 14/927,423

(22) Filed: Oct. 29, 2015

(65) Prior Publication Data

US 2016/0121722 A1    May 5, 2016

(30) Foreign Application Priority Data

Oct. 29, 2014 (GB) .................................. 1419275.1

(51) Int. Cl.
*B60K 31/00* (2006.01)
*E02F 9/20* (2006.01)
(Continued)

(52) U.S. Cl.
CPC ............ *B60K 31/00* (2013.01); *B60K 17/356* (2013.01); *B60K 26/02* (2013.01); *E02F 9/2012* (2013.01);
(Continued)

(58) Field of Classification Search
CPC .. B60W 10/06; B60W 10/103; B60W 30/182; E02F 9/2253
See application file for complete search history.

(56) References Cited

U.S. PATENT DOCUMENTS 6,173,513 B1   1/2001 Akimoto
7,740,254 B2 * 6/2010 Takemura ................ B60G 9/02
                                                    280/124.111
(Continued)

FOREIGN PATENT DOCUMENTS

EP    0 282 138 A2    9/1988
EP    0282138 A2 *    9/1988   ............ B60W 10/06
(Continued)

OTHER PUBLICATIONS

Extended European Search Report for European Patent Application No. 15 19 2197, dated Apr. 21, 2016.
Search Report for GB 1 419 275.1, dated Apr. 17, 2015.

*Primary Examiner* — Katy M Ebner
(74) *Attorney, Agent, or Firm* — Marshall, Gerstein & Borun LLP

(57) ABSTRACT

A working machine having a body supported on a ground engaging structure and a working arm mounted to the body so as capable of performing working operations. The working machine having a drive arrangement to propel the working machine including a prime mover and a hydrostatic transmission including at least one hydraulic pump driven by the prime mover, and at least one motor driven by hydraulic fluid. The working machine also having a hand throttle for selectively setting the power output of the prime mover, a foot throttle for dynamically adjusting the power output of the prime mover in a first mode of operation, wherein the transmission is configured to operate in a second mode of operation when a predetermined criterion is met, and in the second mode the foot throttle directly controls the speed of movement of the ground engaging structure.

20 Claims, 7 Drawing Sheets

(51) Int. Cl.
  *E02F 9/22* (2006.01)
  *B60K 17/356* (2006.01)
  *B60K 26/02* (2006.01)
  *F15B 11/08* (2006.01)
  *F15B 13/04* (2006.01)

(52) U.S. Cl.
  CPC ............ *E02F 9/2253* (2013.01); *F15B 11/08* (2013.01); *F15B 13/0401* (2013.01); *F15B 2211/205* (2013.01); *F15B 2211/40* (2013.01)

(56) References Cited

U.S. PATENT DOCUMENTS

2004/0188168 A1   9/2004   Aumann
2014/0011638 A1   1/2014   Iwaki

FOREIGN PATENT DOCUMENTS

| EP | 1 455 119 A2 | 9/2004 | |
| EP | 1455119 A2 * | 9/2004 | ............ B60W 10/06 |
| EP | 1 595 734 A1 | 11/2005 | |

* cited by examiner

WORKING MACHINE

FIELD OF THE INVENTION

The present invention relates to working machine. More particularly, but not exclusively, the present invention relates to throttle and travel speed control of a working machine.

BACKGROUND OF THE INVENTION

Various types of working machines are known. Such machines are used typically for soil-shifting operations (e.g. trenching, grading, and loading) and materials handling (e.g. depositing aggregate in trenches, lifting materials and placing them on an elevated platform).

Such machines are typically manufactured from a set of subassemblies designed specifically for one type of machine, although certain components such as engines, gearboxes, and hydraulic pumps and undercarriages may be shared across different machine types.

Examples of known machines include the following:

Slew excavators comprise a superstructure rotatable in an unlimited fashion relative to an undercarriage. The superstructure includes a working arm arrangement for manipulating an attachment, such as a bucket, to perform working operations of the type listed above, a prime mover, such as a diesel IC engine, a hydraulic pump, and an operator cab. The prime mover drives the hydraulic pump, in order to provide pressurized fluid to operate the working arm arrangement, and also to power one or more hydraulic motors located in the undercarriage that are used to selectively drive either two endless tracks or four wheels (or eight wheels in a dual wheel configuration) for propelling the excavator.

A slew ring rotatably connects the superstructure and undercarriage, and a central rotary joint arrangement enables hydraulic fluid to pass from the pump in the superstructure to the hydraulic motor, and return to the superstructure, irrespective of the relative positions of the superstructure and undercarriage. If the slew excavator uses tracks for propulsion, steering is effected by differentially driving the tracks on opposing sides of the undercarriage. If the slew excavator uses wheels for propulsion, a steering arrangement is used for either two or four wheels, and separate hydraulic control is required for this in the undercarriage.

Slew excavators are available in a wide range of sizes. Micro, mini and midi excavators span an operating weight range from around 750 kg up to around 12,000 kg and are notable for typically having a working arm arrangement that is capable of pivoting about a substantially vertical axis relative to the superstructure by using a "kingpost" interface to the superstructure. Generally, mini and midi excavators have a weight of above around 1,200 kg. Large excavators, whose operating weight exceeds around 12,000 kg are often referred to as 'A frame' excavators and typically have a working arm arrangement that is fixed about a vertical axis, and can therefore only slew together with the superstructure. This is a function of the fact that the smaller excavators are expected to operate in more confined spaces and the ability to slew about two mutually offset axes in order to, for example, trench close to an obstacle such as a wall is therefore more desirable for micro, mini and midi excavators.

The working arm arrangement generally includes a boom pivotally connected to a dipper. There are several types of booms available including: a triple articulated boom which has two pivotally connected sections; and a mono boom that is often made from a single generally curved structure. A dipper is pivotally connected to the boom and a mount for an attachment, e.g. a bucket, is provided on the dipper. Hydraulic cylinders are provided to move the boom, dipper and mount relative to each other so as to perform a desired working operation.

Tracked excavators are not able to travel under their own propulsion for significant distances due to a low maximum speed and the damage their metal tracks cause to paved roads. However their tracks enhance the stability of the excavator. Wheeled excavators are capable of "roading" at higher speeds (typically up to 40 kph), and without appreciably damaging paved road surfaces. However, the working arm assembly inevitably extends forward of the superstructure during roading, which can impair ride quality, and forward visibility. When performing working operations the pneumatic tires provide a less stable platform than tracks, so additional stabilizer legs can be deployed for stability.

Since the prime mover, hydraulic pump, hydraulic reservoir etc. are located in the superstructure, the center of gravity of all types of slew excavator is relatively high. Whilst these components can be positioned to act as a counterbalance to forces induced during working operations, packaging constraints may force such positioning to be sub-optimal, and may also restrict sight-lines over the rear of the machine, for example.

Excavators are generally used for operations such as digging. However, if it is desired to perform an operation such as loading, an alternative type of machine must be used. Machines capable of loading operations are known and have various formats. In one format, commonly referred to as a "telescopic handler" or "telehandler", the superstructure and undercarriage are fixed relative to each other and a central working arm in the form of a two or more part telescopic boom extends fore-aft of the machine. The boom pivots about a horizontal axis towards the aft end of the machine, an attachment is releasably mounted to a fore end of the boom, and is pivotable about a second distinct horizontal axis. Commonly used attachments include pallet forks and shovels. Telehandlers may be used for general loading operations (e.g. transferring aggregate from a storage pile to a required location on a construction site) and lifting operations, such as lifting building materials on to an elevated platform.

Telehandlers typically have four wheels on two axles for propulsion, with one or both axles being steerable and driven. A prime mover (typically a diesel IC engine) may be located in a pod offset to one side of the machine between front and rear wheels and is connected to the wheels by a hydrostatic or mechanical transmission. An operator cab is often located on the other side of the boom to the prime mover, and is relatively low between the wheels. Depending upon its intended application, the machine may be provided with deployable stabilizer legs.

A subset of telehandlers mount the cab and boom on a rotatable superstructure in order to combine lifting with slewing operations, at the expense of additional weight and greater height. As these machines are used principally for lifting, instead of loading, they have a longer wheelbase than conventional telehandlers to accommodate a longer boom, impacting maneuverability. Further, as sight-lines towards the ground close to the machine are less critical for lifting than for excavating, these are consequently quite poor.

The cost to develop different machines such as those above for different working applications is significant. Further, the cost and delay to switch a production line from one type of machine to another is also significant.

It is further desirable that working machines become more efficient in operation, in terms of the amount of working operations undertaken for a given amount of fuel used. This may be a function of the fuel efficiency of the prime mover, transmission, driveline and hydraulic system, as well as being due to secondary factors such as poor visibility meaning that an operator needs to reposition the working machine unnecessarily frequently so as to view the working operation or carrying out an operation much more slowly, thereby compromising efficiency.

The present applicant has recognized that one area where efficiency of machines having a hydrostatic drive can be improved is in the control of the engine throttle.

Conventionally, a hand throttle is used when excavating and the vehicle is static. The working machine engine is set to a relatively high speed (e.g. 2000 rpm) such that sufficient hydraulic fluid at a high pressure is supplied to the hydraulic cylinders from the hydraulic pump for performing working operation quickly and with sufficient power. However, if a working machine is to be repositioned in the course of a working operation, the hand throttle should be reduced to zero, and the foot throttle used to more finely control engine speed so that the hydraulic pump supplying fluid to the hydrostatic drive does not result in too rapid, sudden maneuvers which may be unsafe if the drive is engaged at a high engine speed. After repositioning the engine speed then needs to be reset to the desired engine speed for working operations. This delays such working operations and is therefore inefficient and undesirable.

SUMMARY OF THE INVENTION

A first aspect of the invention provides a working machine comprising a ground engaging structure; a body supported on the ground engaging structure; a working arm mounted to the body so as capable of performing working operations; a drive arrangement for moving the ground engaging structure to propel the working machine, the drive arrangement including a prime mover and a hydrostatic transmission comprising at least one hydraulic pump driven by the prime mover, and at least one motor driven by hydraulic fluid supplied by the at least one hydraulic pump; a hand throttle for selectively setting the power output of the prime mover; a foot throttle for dynamically adjusting the power output of the prime mover in a first mode of operation; wherein the transmission is configured to operate in a second mode of operation when a predetermined criterion is met, and in the second mode the foot throttle directly controls the speed of movement of the ground engaging structure.

Advantageously this enables the machine to be repositioned between working operations in a quick, safe and efficient manner that does not require the hand throttle to be disengaged first.

In one embodiment, the predetermined criterion is a non-zero input from the hand throttle.

Advantageously this provides a convenient way of switching between the first and second modes of operation.

In one embodiment, the predetermined criterion is an input from the hand throttle above a predetermined level.

In another embodiment predetermined criterion is an input from a site/highway selector. Advantageously this may enhance operator understanding of the system.

The hand throttle may optionally be configured to set the maximum speed of movement of the ground engaging structure in the second mode. This enables the ground speed to be limited when the working machine is undertaking an operation requiring fine control.

In one embodiment, the working machine is configured to control speed of movement by varying hydraulic fluid flow between a directional control valve and a hydraulic motor connected to the ground engaging structure separately from prime mover speed.

Advantageously, this arrangement enables speed to be controlled separately from prime mover speed.

In one embodiment, the working machine is configured to vary hydraulic flow in response to load imposed on the drive arrangement, so as to maintain a substantially fixed predetermined relationship between foot throttle demand and the speed of the ground engaging structure.

Advantageously this provides a predictable response between foot throttle demand and speed.

In one embodiment the working machine further comprises a wheel speed sensor and/or a ground speed sensor such that the substantially fixed predetermined relationship may be maintained.

In one embodiment, the fixed relationship is a substantially linear relationship.

In one embodiment, the working machine comprises an electronic control unit (ECU) to receive signals from the foot throttle and send electrical control signals to control the flow of hydraulic fluid to the at least one motor in the second mode.

Electronic control advantageously permits the present invention to be implemented in a simple way.

In one embodiment, the ECU controls a proportional valve to control the flow of hydraulic fluid.

In one embodiment, the ground engaging structure comprises at least four wheels

In one embodiment, the working machine comprises two hydraulic motors, a first motor driving a front axle and a second motor driving a rear axle, In one embodiment, the first motor is a low speed motor and the second motor is a relatively high speed motor.

Advantageously, it will be appreciated this provides a simple and low cost way of providing a working machine with a two range, and selectable 2WD/4WD transmission, without requiring a complex gearbox. Further the arrangement may save weight by avoiding the need for two drive shafts from a motor to each axle driven by the motor, and may also avoid improve packaging by freeing space previously occupied by the drive shafts for other uses.

In one embodiment, the second axle is a rear axle in a normal direction of travel.

In one embodiment, at least one of the first and second hydraulic motors is located proximate its respective axle.

Advantageously, this removes the need for a long driveshaft.

In one embodiment, at least one hydraulic motor is directly connected to its respective axle.

Advantageously, this removes the need for a drive shaft at all.

In one embodiment, both motors are directly connected to their respective axles.

In one embodiment, the low speed motor comprises a reduction gear.

In one embodiment, the working machine comprises a second low pressure pump driven by the prime mover for providing hydraulic fluid for further working machine functions.

Advantageously, this provides a more efficient supply of hydraulic fluid at pressures needed for particular purposes.

In one embodiment, the drive to the first and second pumps is in series.

In one embodiment, the drive to the first and second pumps is in parallel, e.g. via a bevel gearbox.

In one embodiment, the body comprises an undercarriage and a superstructure rotatable thereon.

In one embodiment, the prime mover, first hydraulic pump and first and second hydraulic motors are mounted in the undercarriage.

Advantageously, this improves operator visibility.

In one embodiment, a majority of the prime mover is positioned below a level coincident with an upper extent of the wheels.

In one embodiment, the prime mover is positioned between the front and rear axles.

Advantageously, this improves the packaging of the working machine.

In one embodiment, the prime mover is mounted in a transverse direction to a fore-aft direction of the working machine.

In one embodiment, the prime mover is mounted substantially perpendicular to the fore-aft direction of the working machine.

In one embodiment, the prime mover is a reciprocating engine including pistons and the engine is mounted such that the pistons have an upright orientation.

In one embodiment, a heat exchanger and cooling fan are mounted adjacent the prime mover and arranged such that an axis of rotation of the fan is substantially parallel to a fore-aft direction of the working machine.

Advantageously, this improves packaging and cooling of the working machine.

In one embodiment, the working machine comprises a fuel tank positioned on one side of an axis extending in the fore-aft direction of the working machine and the prime mover is positioned on the other side of an axis extending in the fore-aft direction of the working machine.

In one embodiment, the working machine comprises a hydraulic fluid tank positioned on one side of an axis extending in a fore-aft direction of the working machine and the engine is positioned on the other side of the axis extending in the fore-aft direction of the working machine.

In one embodiment, the rotary connection between the superstructure and the undercarriage includes a rotary joint arrangement configured to permit electrical signals and/or hydraulic fluid to be routed to the superstructure independently of the position of the superstructure relative to the undercarriage.

In one embodiment, the front and rear axles are configured for at least two wheel steer.

In one embodiment, the front and rear axles are configured for four wheel steer.

A further aspect of the invention provides a method of operating a working machine according to the first aspect comprising the steps of: causing the transmission to enter the second mode of operation and operating the foot throttle to reposition the machine.

BRIEF DESCRIPTION OF THE DRAWINGS

Embodiments of the invention will now be described, by way of example only, with reference to the accompanying drawings, in which.

DETAILED DESCRIPTION

General Format

Figure 1:
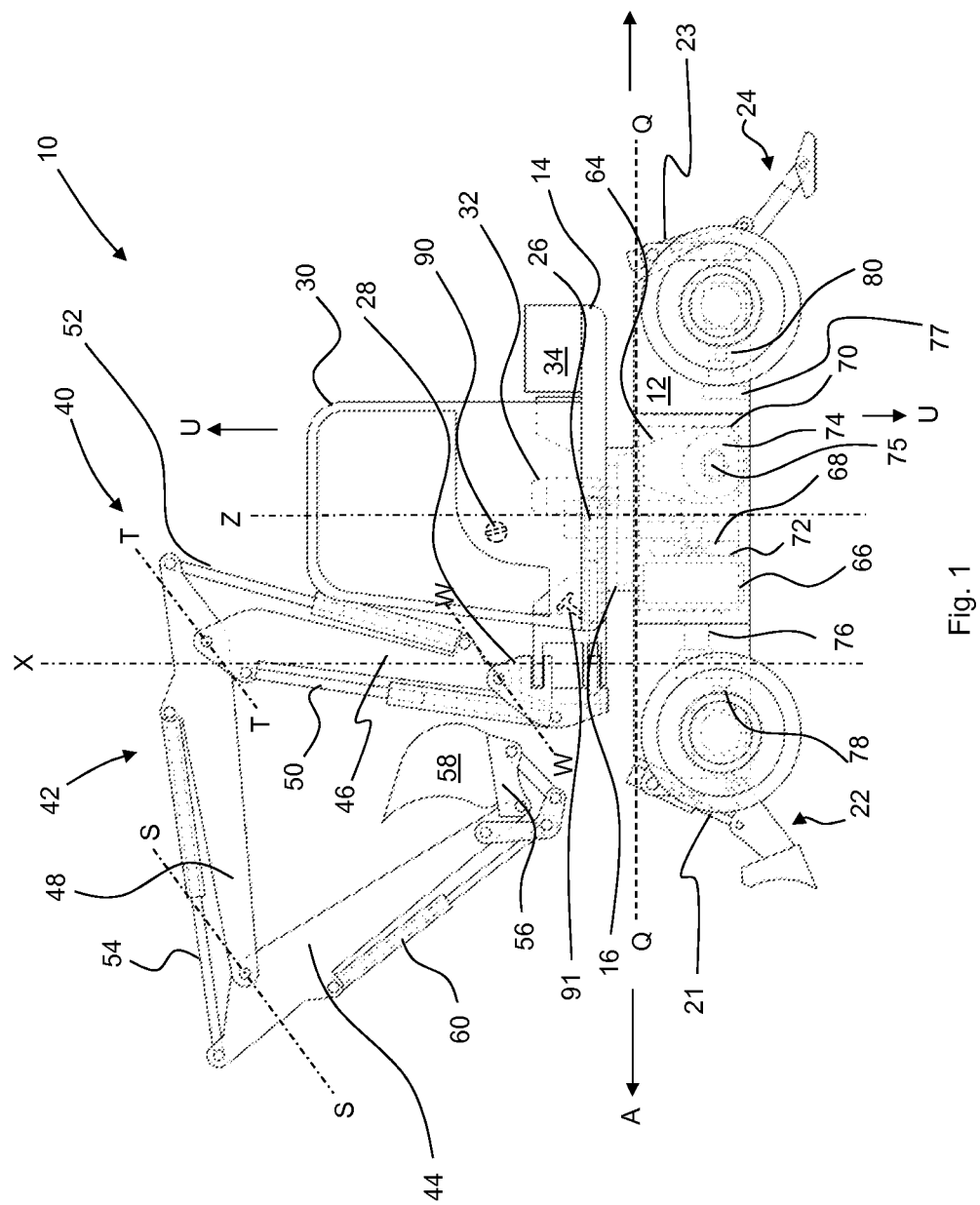
FIG. 1 is a side view of a working machine according to an embodiment of the present invention.
Figure 2:
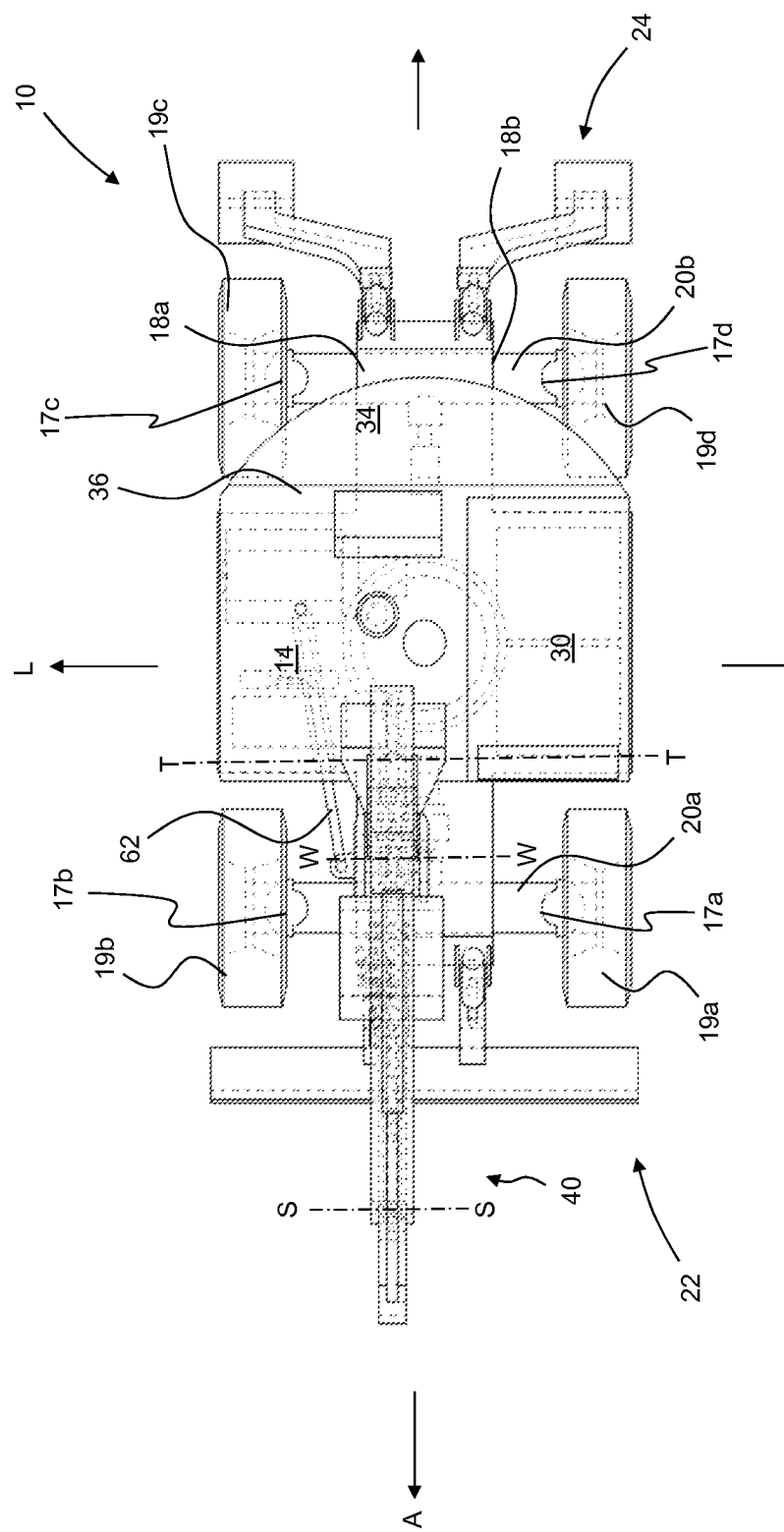
FIG. 2 is a plan view of the machine of FIG. 1.
Figure 3:
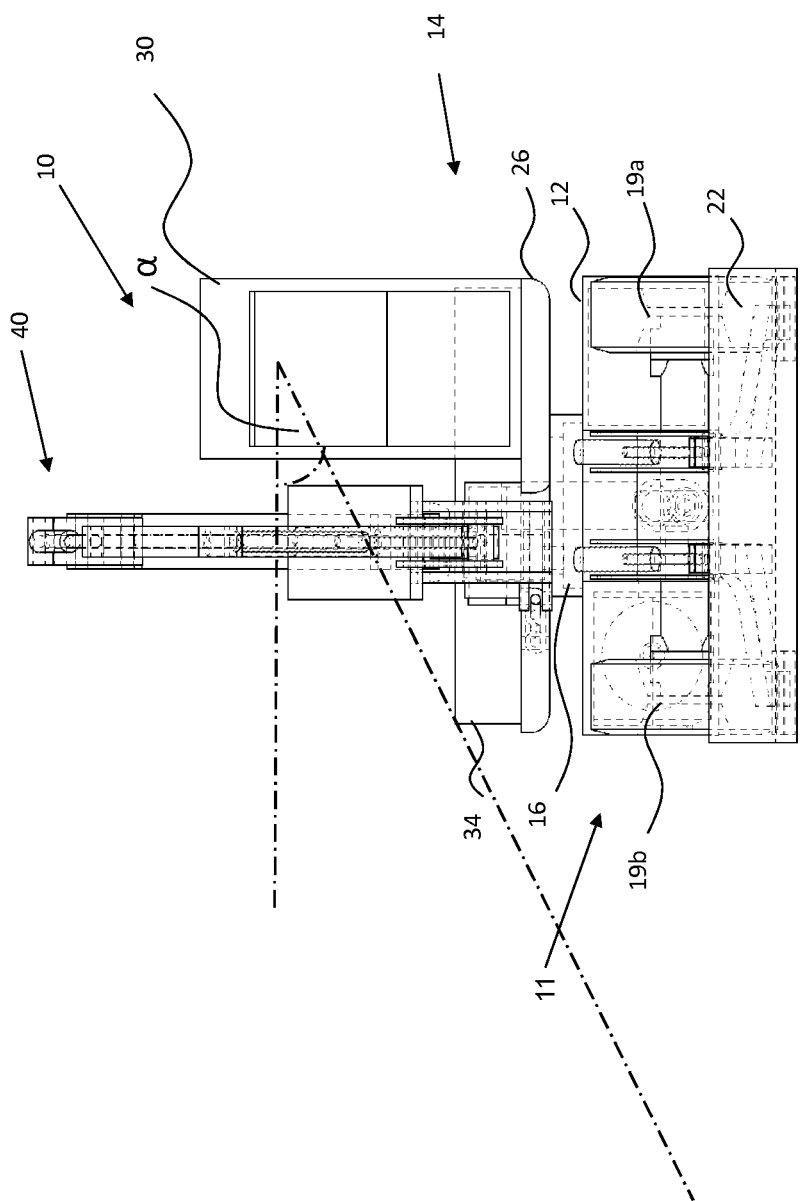
FIG. 3 is a front view of the machine of FIG. 1.

With reference to FIGS. 1 to 3, there is illustrated in somewhat simplified form a working machine 10 according to an embodiment of the present invention. In the present embodiment, the working machine may be considered to be a midi excavator (operating weight between approx. 6 and 12 metric tons). In other embodiments the working machine may be a mini excavator (operating weight between 1.2 and 6 metric tons). The machine comprises an undercarriage 12 and a superstructure 14 linked by a slewing mechanism in the form of a slewing ring 16. The slewing ring 16 permits unrestricted rotation of the superstructure relative to the undercarriage 12 in this embodiment. A cab 30 from which an operator can operate the working machine is mounted to the superstructure. A working arm arrangement 40 is rotatably mounted to the superstructure and provided for performing excavating operations.

Undercarriage

The undercarriage is formed from a pair of spaced chassis rails 18*a* and 18*b* extending fore-aft, and typically but not always being parallel, or substantially so. The rails provide a majority of the strength of the undercarriage 12. The undercarriage is connected to a ground engaging structure, which in this embodiment includes first and second drive axles 20*a* and 20*b* mounted to the chassis rails and wheels rotatably attached to each axle end. In this embodiment the second drive axle 20*b* is fixed with respect to the chassis rails 18*a*, 18*b*, whereas the first drive axle 20*a* is capable of limited articulation, thereby permitting the wheels to remain in ground contact, even if the ground is uneven. The wheels connected to both axles are steerable via steering hubs 17*a*, 17*b*, 17*c*, 17*d*. In this embodiment, the wheelbase is 2.65 m, and a typical range is 2.0 m to 3.5 m.

For the purposes of the present application, the fore-aft direction A is defined as a direction substantially parallel to the general direction of the chassis rails 18*a* and 18*b*. A generally upright direction U is defined as a direction substantially vertical when the working machine is on level ground. A generally lateral direction L is defined as a direction that is substantially horizontal when the working machine is on level ground and is substantially perpendicular to the fore-aft direction A.

In this embodiment, a dozer blade arrangement 22 is pivotally secured to one end of the chassis rails 18*a* and 18*b*, which may be raised and lowered by hydraulic cylinders 21 using a known arrangement, and also act as a stabilizer for the machine, by lifting the adjacent wheels off the ground when excavating, however this may not be provided in other preferred embodiments.

A stabilizer leg arrangement 24 is pivotally mounted to an opposite end of the chassis rails 18*a* and 18*b*, which also may be raised and lowered by hydraulic cylinders 23 using a known arrangement, but in other embodiments may be omitted.

Drive

Figure 4:
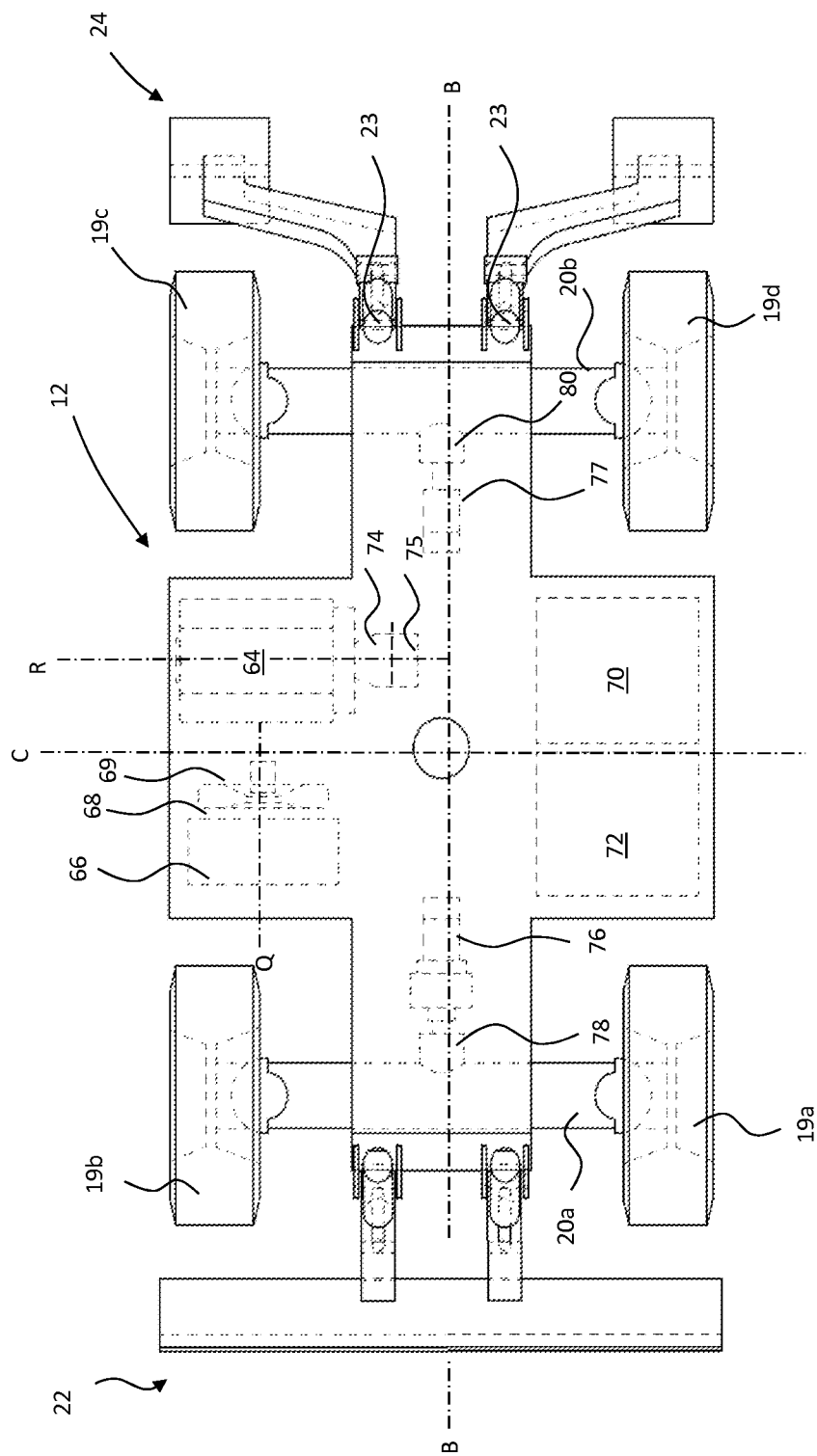
FIG. 4 is a plan view of an undercarriage portion of the machine of FIG. 1.

Referring now to FIG. 4, contrary to known excavators, the drive arrangement, including a prime mover and transmission are housed in the undercarriage 12. In the present embodiment, the prime mover is a diesel IC engine 64. The engine 64 is mounted to one side of an axis B extending centrally through the undercarriage in a fore-aft direction. The engine 64 is mounted transverse to the axis B, i.e. an axis of rotation R of a crankshaft of the engine is transverse to the axis B in the fore-aft direction. The engine 64 is further orientated such that the pistons of the engine extend in the substantially upright direction U.

A heat exchanger 66 and cooling fan 68 are housed in the undercarriage adjacent the engine 64. The cooling fan is orientated such that the axis of rotation Q of the fan extends in a fore-aft direction A, although it may be orientated differently in other embodiments.

A fuel tank 70 providing a fuel supply to the engine 64 is positioned on an opposite side of the axis B to the engine. A hydraulic tank 72 is provided adjacent the fuel tank 70 on an opposite side of the axis B to the engine.

The engine 64, heat exchanger 66, cooling fan 68, fuel tank 70 and hydraulic tank 72 are all housed in a region between the axles 20a and 20b. As can be seen in FIG. 1, the engine is positioned below a level coincident with a lower extent of the superstructure. Indeed the majority of the engine 64, and in this embodiment the entire engine 64 is positioned below a level Q coincident with an upper extent of the wheels 19a, 19b, 19c, 19d. In the present embodiment the majority of the heat exchanger 66, cooling fan 68, fuel tank 70 and hydraulic tank 72 are below a level Q coincident with the upper extent of the wheels 19a, 19b, 19c, 19d.

Figure 5:
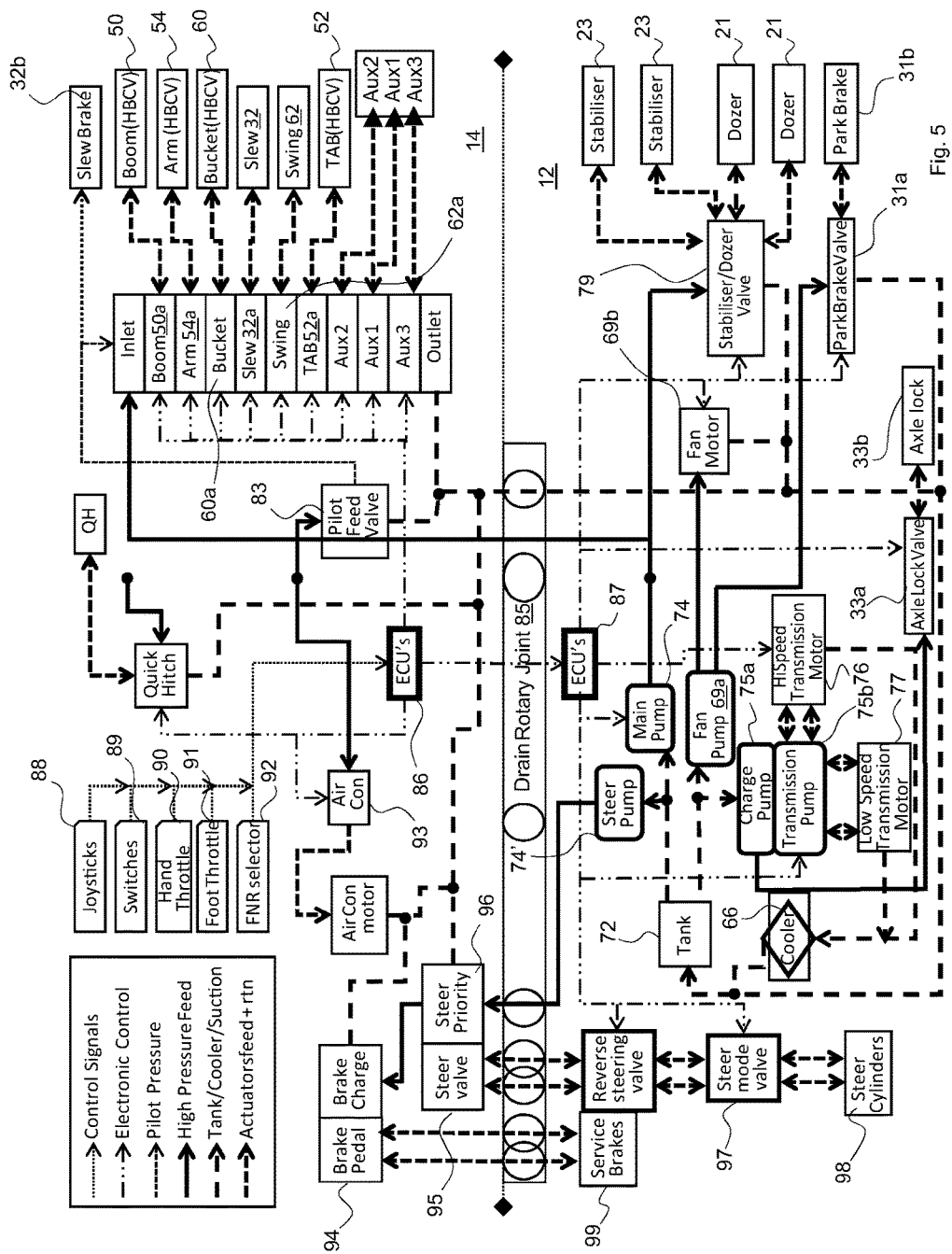
FIG. 5 is a schematic view of a hydraulic and electronic control system of the machine of FIG. 1.

Referring to FIGS. 4 and 5, in the present embodiment the transmission is a hydrostatic transmission. The transmission includes a high pressure swash plate type hydraulic transmission 75b as well as an associated charge pump 75a. The transmission pump in turn is capable of selectively driving two hydraulic motors 76 and 77. The transmission pump 75b has a typical operating pressure of around 350-450 bar (35-45 MPa).

The engine 64 is configured to drive the charge pump 75a, and the transmission pump 75b. The pumps 75a and 75b are configured to draw hydraulic fluid from the hydraulic fluid tank 72 as required and supply to the hydraulic motors 76 and 77 via a dedicated feed and return hoses (i.e. the flow is essentially closed loop but with hydraulic fluid drawn from and returned from the tank 72 as required). In the present embodiment, the hydraulic motor 76 is positioned towards the dozer blade arrangement 22. The engine 64, hydraulic pump 74 and hydraulic motor 77 are positioned towards the stabilizer arrangement 24.

The first hydraulic motor 76 is a high speed swash plate type motor having a large displacement range, for example of 0 to 255 cm3/revolution, and drives the front axle 20a in a normal direction of travel. The output of the motor faces forwards and drives the first axle 20a via a short drive shaft 78 and differential (not shown). The second hydraulic motor 77 is a relatively low speed swash plate type motor having a smaller displacement range for example of 0 to 125 cm3/revolution. The low speed motor 77 connects to a second drive shaft 80 to drive the second (rear) axle 20b via a second differential (not shown).

In other embodiments a single hydraulic motor may provide drive to both the front and rear axles, typically with a two wheel drive/four wheel drive selector operating a clutch to disengage/engage drive to one axle.

The charge pump 75a and transmission pump 75b are positioned adjacent the engine 64 and are orientated such that an input to the pumps from the engine is axially aligned with an output from the engine to the pump.

Arranging the drive arrangement as described in the undercarriage has been found to result a reduction in the volume of components to be housed in the superstructure, in turn resulting in a line of sight (angle α of FIG. 3) over the right hand rear corner of the machine for an operator having a height of 185 cm (a 95th percentile male) when seated in the operator's seat at the left hand side of the machine in excess of 30° (33° in this embodiment) below the horizontal (compared to around 22° in conventional midi excavators of this size). This results in a significant reduction of the ground area around the machine that is obscured by parts of the superstructure, thereby improving visibility for maneuvering the machine.

A further advantage of positioning the drive arrangement in the undercarriage, compared to conventional excavators where the drive arrangement is generally positioned in the superstructure is that noise, vibration and harshness (NVH) isolation is improved between the engine and the cab to improve comfort and safety for an operator. In addition, access to the engine, fuel tank, fluid tank, etc. for maintenance and refueling is at ground level.

Superstructure

The superstructure 14 comprises a structural platform 26 mounted on the slew ring 16. As can be seen in the Figures, the slew ring 16 is substantially central to the undercarriage 12 in a fore-aft direction A and a lateral direction L, so as to mount the superstructure 14 central to the undercarriage. The slew ring 16 permits rotation of the superstructure 14 relative to the undercarriage about a generally upright axis Z.

A rotary joint arrangement 85 is provided central to the slew ring and is configured to provide a multiple hydraulic fluid lines, a return hydraulic fluid line, and an electrical—Controller Area Network (CAN)—signal line to the superstructure from the undercarriage, whilst permitting a full 360° rotation of the superstructure relative to the undercarriage. The configuration of such a rotary joint arrangement is known in the art.

The platform 26 mounts a cab 30. The cab houses the operator's seat and machine controls (discussed below).

The superstructure 14 is rotated relative to the undercarriage 12 using a first hydraulic motor 32 and brake.

The platform further mounts a kingpost 28 for a working arm arrangement 40. The kingpost 28 arrangement is known in the art, and permits rotation of the working arm about a generally upright axis X and about a generally lateral axis W.

The superstructure further comprises a counterweight 34 for the working arm arrangement positioned at an opposite side of the superstructure to the kingpost 28.

Hydraulic Supply

In this embodiment, the engine 64 additionally drives a main, lower pressure hydraulic pump 74 arranged in series with the charge 75a and transmission pumps 75b. In this embodiment the main hydraulic pump has an operating pressure of around 250-300 bar (25-30 MPa) and is also of a variable displacement type.

The main pump 74 supplies hydraulic fluid to the hydraulic cylinders 50, 52, 54, 60, 62 for operating the working arm arrangement via associated valves in the superstructure 14 and denoted by the same numeral with the suffix 'a', to a slew brake via a pilot feed valve 83, and to auxiliary hydraulic fluid supplies for use by certain attachments such a grabs etc. (not shown). The main pump 74 additionally supplies hydraulic cylinders 21, 23 of the dozer blade and stabilizer arrangement via a stabilizer/dozer valve 79 in the undercarriage. However, in alternative embodiments a single pump may be used for supplying hydraulic fluid to the motors and the hydraulic cylinders. The main pump 74 is further used to provide hydraulic fluid for air conditioning 93, as illustrated in FIG. 5.

In this embodiment the engine additionally drives a separate pump 74' for the steering system and a fan pump 69a to drive a cooling fan 69b and a park brake valve 31a for a parking brake 31b. These pumps are in this embodiment gear pumps operable at a lower pressure of around 200 bar (20 MPa) and without ECU control.

Further, the charge pump 75a additionally supplies hydraulic fluid to an axle lock valve 33a which selectively prevents the articulation of the front axle 20a.

Working Arm

The working arm arrangement 40 of the present embodiment is an excavator arm arrangement. The working arm arrangement includes a triple articulated boom 42 pivotally connected to a dipper 44. The triple articulated boom 42 includes a first section 46 pivotally connected to a second section 48. A hydraulic cylinder 50 is provided to raise and lower the first section 46 of the boom 42 relative to the kingpost 28 about the generally lateral axis W. A further hydraulic cylinder 52 is provided to pivot the second section 48 of the boom 42 relative to the first section of the boom about a generally lateral axis T. A yet further hydraulic cylinder 54 is provided to rotate the dipper 44 relative to the boom 42 about a generally lateral axis S. A mount 56 is provided to pivotally mount an attachment to the dipper 44, in the present embodiment the attachment is a bucket 58. A hydraulic cylinder 60 is provided to rotate the attachment relative to the dipper 44. Alternatively boom cylinder arrangements (e.g. twin cylinders) may however be utilized in other embodiments.

Shown most clearly in FIG. 2, a yet further hydraulic cylinder 62 is provided to rotate (swing) the working arm arrangement 40 about the generally upright axis X. Using a hydraulic cylinder arrangement to rotate the working arm arrangement simplifies manufacture and operation of the working machine 10.

Machine Controls

A number of machine control inputs are provided in the cab 30. In this embodiment the inputs (with the exception of steering and braking) are electrically transmitted via a CAN bus to one or more superstructure Electronic Control Units (ECUs) 86, incorporating a suitable microprocessor, memory, etc. to interpret the inputs to signal the various valves for controlling movement of the working arm etc. and/or one or more further undercarriage ECUs 87 to ultimately control hydraulic functions in the undercarriage, including a stabilizer/dozer valve 79, a fan motor 69b, park brake valve 31a, axle lock valve 33a, main pump 74, transmission pump 75b, steer mode valve 97.

In alternative embodiments an ECU may only be provided in base assembly (e.g. housed in the undercarriage) and signals from the machine input controls may be sent directly to the ECU 87 in the undercarriage instead of via the ECU 86 in the superstructure. The electrical connections for such an arrangement can be routed from the control inputs to the ECU 87 via the slew ring and rotary joint arrangement.

The control inputs include: joysticks 88 to control operation of the working arm 40, switches 89 for various secondary functions, a hand throttle 90 to set engine speed for working operations, a foot throttle 91 to dynamically set engine speed for roading/maneuvering, and a forward/neutral/reverse (FNR) selector 92 to engage drive in a desired direction.

Due to the safety-critical nature of steering and braking, the brake pedal and steering are hydraulically controlled by a brake pedal 94 and steer valve 95 linked to a steering wheel (not shown). Hydraulic fluid feed is from the dedicated steer pump 74' via the rotary joint 85 and a priority valve 96, which ensure an appropriate supply of hydraulic fluid is provided to the brake pedal 94/orbitrol valve 95, dependent upon demand.

The steer valve 95 then feeds a steer mode valve 97 in the undercarriage 12, which controls whether the machine is operating in four-wheel steer (off road), two-wheel steer (on road) or crab steer, via another feed through the rotary joint. The steer mode valve then feeds hydraulic fluid to appropriate steering cylinders 98, dependent upon the mode chosen.

The brake pedal 94 supplies fluid to service brakes 99 at the wheel ends also via a feed through the rotary joint. A separate hydraulic fluid feed from a fan pump 69a supplies a parking brake valve 31a as well as the fan motor 69b and axle lock valve 33a under the control of the superstructure ECU(s) 86 and undercarriage ECU(s) 87.

In other embodiments, braking and steering may be affected via electronic control, provided a suitable level of fault tolerance is built into the system.

High Speed Roading Operation

When operating on road ("roading") or e.g. maneuvering on a level/hard surface, speed of movement of the machine 10 is preferred ahead of traction or torque. Thus, in a first two-wheel drive operating mode, the vehicle operator selects 2WD on a 2WD/4WD selector (not shown), signaling the appropriate superstructure ECU 86, in which in turn signals the transmission pump 75b via the undercarriage ECU 87 to permit the flow of hydraulic fluid to the high speed motor 76.

Thereafter, the operator selects forward or reverse from the FNR selector 92, the signal for which is fed through to the transmission pump 75b in a similar manner to direct hydraulic fluid therethrough in the correct flow direction to turn the high speed motor 76, and therefore the wheels 19a and 19b, in the desired direction.

The operator then sets the engine speed using the foot throttle 91 which in turn drives the transmission pump 75b at the desired speed. The undercarriage ECU 87 controls the swash angle of the pump 75b and high speed motor 76, resulting in rotation of the high speed motor 76 and driven rotation of the wheels 19a, 19b on the first axle 20a.

Typically, this enables travel at a maximum speed of around 40 km/h.

Low Speed Operation

For low speed, higher torque, higher traction maneuvering, typically in an off-road location such as a construction site, the operator selects a second four wheel drive operating mode from the 2WD/4WD selector. This in turn signals superstructure ECU 86, which in turn signals the transmission pump 75b via the undercarriage ECU 87 to permit the flow of hydraulic fluid to both the high speed motor 76 and low speed motor 77.

Thereafter, the operator selects forward or reverse from the FNR selector 92, the signal for which is fed through to the transmission pump 75b in a similar manner to determine the direction of flow of hydraulic fluid into the high speed motor 76 and low speed motor 77.

The operator then sets the engine speed using the foot throttle 91 which in turn drives the transmission pump 75b at the desired speed. The undercarriage ECU 87 preferably controls the swash angle of the pump 75b and high speed motor 76, ultimately resulting in rotation of the high speed motor 76, low speed motor 77 and drive to the wheels 19a, 19b, 19c, 19d on both the first and second axles 20a, 20b at compatible speeds.

Typically, this operating mode provides a lower maximum speed for off-road operation e.g. of 10 km/h or less.

Repositioning During Working Operations

During working operations, such as trenching or grading, the operator sets the hand throttle to a non-zero position to set a desired engine speed for operations at an appropriate operating speed.

In this condition, the ECU 86 is programmed to control the drive of working machine 10 differently. With the hand throttle 90 at a non-zero position, inputs from the foot throttle 91 are interpreted by the ECU 86 as a wheel speed demand signal, not an engine speed demand signal. This constitutes a second mode of operation of the transmission, which may be referred to as a "site mode" or "dig mode".

Figure 6:
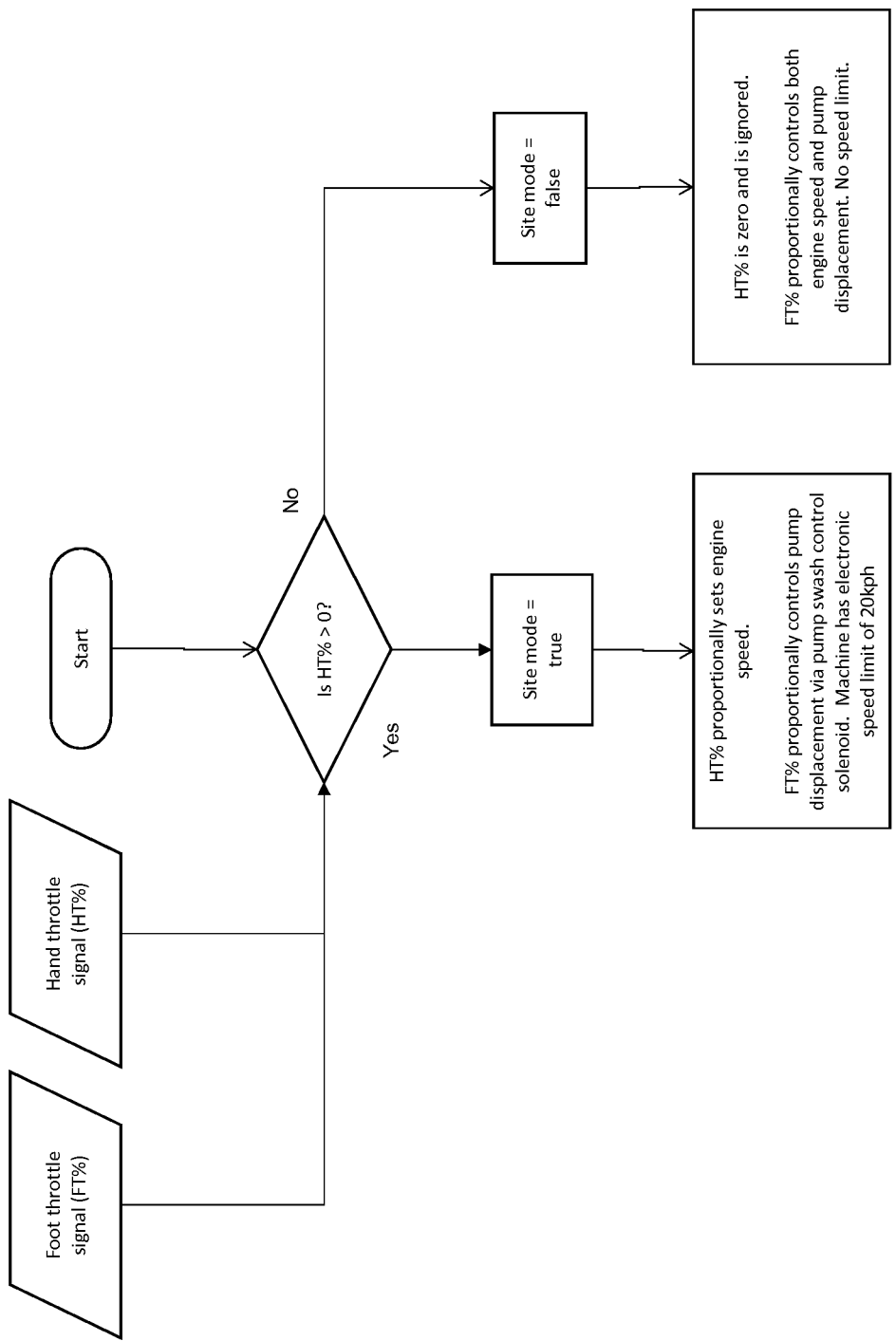
FIG. 6 is a flowchart illustrating operation of the machine according to an embodiment of the present invention.

With reference to the flow chart of FIG. 6, to enable this, the superstructure ECU 86 interprets monitors both the hand throttle and foot throttle signals HT % and FT %, and if HT % is greater than zero, enters site mode. In this mode, the hand throttle continues to provide an engine speed demand signal (i.e. to proportionally control engine speed in a conventional manner) and to set the engine speed demand at a desired level, and keep it at that level unless there is further operator intervention. However, the foot throttle, instead of continuing to control engine speed above the level set by the hand throttle, now proportionally controls transmission pump 75b displacement. In a swash plate-type pump, this is achieved by controlling the pump swash angle using a suitable control solenoid (not shown), for example.

Thus, to carry out a slow forward repositioning maneuver, when the engine speed is set to an appropriate level for the working operation being carried out on the hand throttle 90, the operator selects Forward on the FNR selector 92 and lightly depresses the foot throttle 91. This is interpreted by the superstructure ECU 86, and transmitted via the undercarriage ECU 87 to the control solenoid (not shown) to result in a slight change of the swash angle of the pump, resulting in a relatively low forward speed despite the operating high speed of the transmission pump 75b, making the machine safe to control during the maneuver. Depressing the foot throttle by a greater amount will cause an increase in forward speed. However, in view of the fact this mode will occur on a site often with restricted space and other personnel and machinery in the vicinity whose safety needs to be maintained, an upper speed is preferably set electronically at say 20 km/h.

In order to create a substantially linear relationship between the foot throttle demand and wheel speed, independent of the load applied to the drive arrangement, suitable wheel, transmission or ground speed sensors may be provided to supply feedback to the lower ECU 87 on the pump swash angle in a closed-loop manner. The hydraulic fluid is supplied to one or both of the high and low speed motors 76, 77, dependent upon whether the 2WD or 4WD is selected.

In other embodiments, an additional solenoid proportional flow control valve in the feed or return path to the high speed motor 76, or a bypass path for the high speed motor with suitable flow control, may be provided.

As a consequence of this arrangement, the operator is able to quickly and safely reposition the working machine between or during working operations, without needing to adjust the hand throttle 90.

Figure 7:
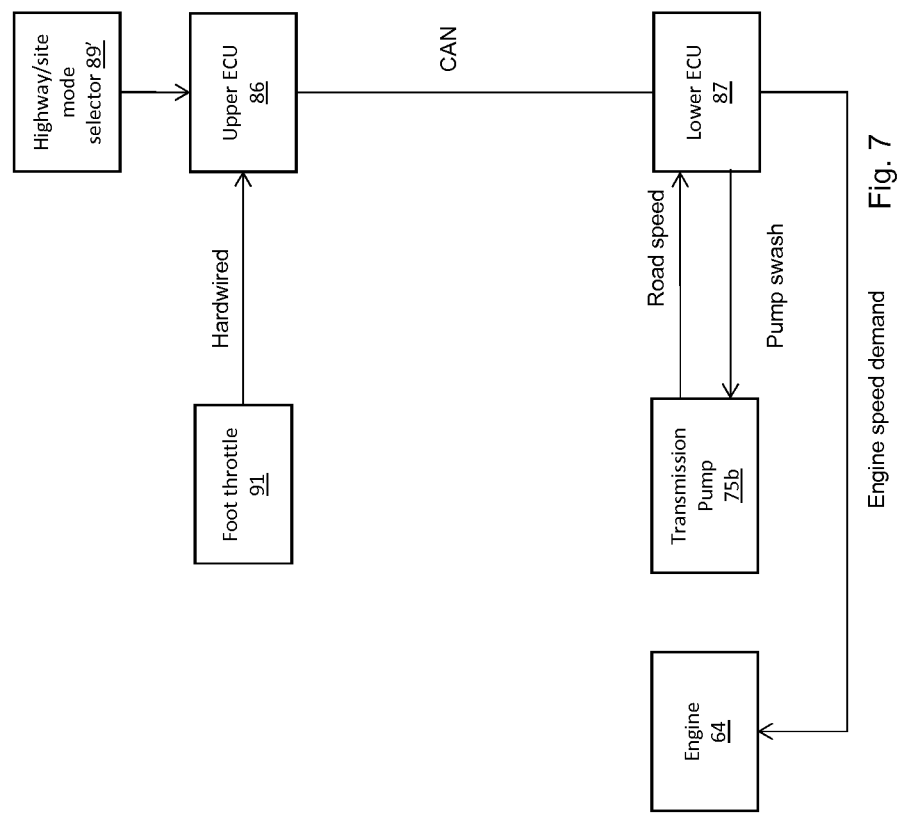
FIG. 7 is a simplified schematic view of a control system according to another embodiment of the present invention.

In a further embodiment, illustrated in FIG. 7, an additional site/highway selector input 89', e.g. a suitable switch, button or control screen icon, is provided rather than the hand throttle in effect acting in this role in the embodiment of FIG. 6.

In this embodiment, the transmission operates using a similar principle as the first embodiment. When the selector is in highway mode, the foot throttle 91 controls road speed in conventional manner i.e. via engine speed. In this embodiment, inputs to the hand throttle are ignored in highway mode.

When site mode is selected, the hand throttle 90 level is used to set maximum speed up to a maximum safe site limit (e.g. 20 km/h as in the first embodiment), as well as the engine speed suitable for the working operation being carried out. Thus, for working operations requiring finer control and therefore lower revs, the maximum travel speed is lower than for operations requiring more hydraulic power (e.g. greater bucket tear-out force) and more engine revs.

In this mode, the foot throttle 91 again controls the transmission pump 75b swash angle to control wheel speed, optionally with closed loop feedback on actual wheel speed or ground speed in order that the relation between the amount the foot throttle is actuated and the wheel/ground speed is as linear as possible.

Although described in relation to an excavator having the prime mover, pumps, motors and tanks in the undercarriage, it will be appreciated that this arrangement may be applicable to conventional excavators where the prime mover, etc. are located in the superstructure, and for other working machines having a hydrostatic drive, such as certain telehandlers, skid steer loaders etc. For certain such machines, this mode may have further benefits in that it enables for finely controlled wheel speed when simultaneously performing a working operation. This may be useful, for example when using a front shovel in a grading operation or inching forward whilst tipping from a shovel.

In certain embodiments, interlocks may be incorporated into the system, e.g. to prevent drive being sent to the wheels whilst the stabilizer legs 24/dozer blade 22 are lowered, or limiting travel speed if the working arm is in certain positions.

Variants

Although the invention has been described above with reference to one or more preferred embodiments, it will be appreciated that various changes or modifications may be made without departing from the scope of the invention as defined in the appended claims.

The pressure and/or flow of hydraulic fluid may be directed to the high and low speed motors 77, 76 in the low speed operating mode in order to shift the balance of power to either motor. For example, in response to the machine sensing loss of traction on one axle through the use of suitable sensors, hydraulic flow may be diverted to the other axle.

The low speed and/or high speed motors may be connected directly to the or each axle they drive, or a pair of high speed motors may drive individual wheels on one axle and low speed motors individual wheels on the second axle.

Although in this embodiment, the high pressure pump is illustrated as providing hydraulic fluid for the main control valve, and therefore for the various hydraulic cylinders and motors, in other embodiments the supply to the main control valve may be from the low pressure pump.

In other embodiments the high and low pressure pumps may be driven in parallel rather than in series via a bevel gearbox, for example and a clutch mechanism may be provided to disengage drive to the pumps if not required for a particular operation.

Although the present invention has been described in the context of a particular machine layout, for which it is considered particularly advantageous, certain advantages of the present invention may be achieved if it is used in more conventional machines such as conventional wheeled slew excavators having engines and hydraulic pumps in the superstructure thereof, or telehandlers, rough terrain cranes etc. having hydrostatic transmissions. The present invention may also be suitable for use with tracked vehicles and those with bodies formed of two mutually articulated portions for steering, each with a fixed axle.

The repositioning mode for the foot throttle may be entered by means other than the non-zero position—this could be a predetermined higher setting (e.g. above 1500 rpm). In further embodiments, working operations could be sensed from usage of the working arm(s) of the machine, or in some instances operator seating position (i.e. it would be entered if the seat is rotated to face a working arm, rather than facing in a different direction for roading, in order to switch to site mode from highway mode.

The switch between site mode and highway mode may also enable/disable other machine systems, such as a layout on any displays provided to the operator, hydraulic functions etc.

The undercarriage ECU 87 may include the logic for interpreting the foot throttle 91 demand signals and controlling the oil flow to the motor(s) in the repositioning mode instead of the superstructure ECU 86.

In the presently described embodiment the engine is positioned perpendicular to the axis B so as to reduce the packaging size of the engine and transmission of the present embodiment, but advantages of the invention can be achieved in alternative embodiments where the engine may be positioned at an alternative transverse position, for example between 30 and 70° to axis B measured in a clockwise direction.

In the presently described embodiment the engine is positioned such that a longitudinal axis of the pistons is orientated substantially upright, but in alternative embodiments the pistons may be alternatively orientated, for example the pistons may be substantially horizontal. In further alternative embodiments, the prime mover may not be a diesel engine, for example the engine may be a petrol engine.

The arrangement of the fuel tank, hydraulic fluid tank, heat exchanger, fan and engine of the present invention is advantageous because of its compact nature, but advantages of the invention can be achieved in alternative embodiments where these components may be positioned in alternative locations, for example the fuel tank and hydraulic fluid tank may not be positioned between the axles.

The working arm described includes a dipper and a triple articulated boom, but in alternative embodiments the boom may only be articulated at the connection to the superstructure and the dipper. In further alternative embodiments a section of the boom or the dipper may be telescopic.

The working machine may be operated using manual hydraulic or electro-hydraulic controls.

In the present embodiment, the wheels on both axles are steerable (i.e. the working machine is configured for four wheel steer), but in alternative embodiments only the wheels on one of the axles may be steerable (i.e. the working machine is configured for two wheel steer).

The invention claimed is:

1. A working machine comprising:
a ground engaging structure;
a body supported on the ground engaging structure
a working arm mounted to the body so as capable of performing working operations; and
a drive arrangement for moving the ground engaging structure to propel the working machine, the drive arrangement including a prime mover and a hydrostatic transmission comprising at least one hydraulic pump driven by the prime mover, and at least one motor driven by hydraulic fluid supplied by the at least one hydraulic pump;
a hand throttle for selectively setting the power output of the prime mover,
a foot throttle for dynamically adjusting the power output of the prime mover in a first mode of operation;
wherein the transmission is configured to operate in a second mode of operation when a predetermined criterion is met, and in the second mode the foot throttle directly controls a speed of movement of the ground engaging structure; and
wherein the hand throttle is configured to set a maximum speed of movement of the ground engaging structure in the second mode.

2. The working machine according to claim 1, wherein the predetermined criterion is a non-zero input from the hand throttle, and wherein the non-zero input from is above a predetermined level.

3. The working machine according to claim 1, wherein the predetermined criterion is an input from a site/highway selector.

4. The working machine according to claim 1, configured to control speed of movement by varying hydraulic fluid flow between a directional control valve and a hydraulic motor connected to the ground engaging structure separately from prime mover speed.

5. The working machine according to claim 4, configured to vary hydraulic flow in response to load imposed on the drive arrangement, so as to maintain a substantially fixed predetermined relationship between foot throttle demand and the speed of the ground engaging structure.

6. The working machine according to claim 5 further comprising a wheel speed sensor and/or a ground speed sensor such that the substantially fixed predetermined relationship may be maintained.

7. The working machine according to claim 1, comprising two hydraulic motors, a first motor driving a front axle and a second motor driving a rear axle.

8. The working machine according to claim 7, wherein the first motor is a low speed motor and the second motor is a relatively high speed motor.

9. The working machine according to claim 7, wherein at least one of the first and second hydraulic motors is located proximate its respective axle.

10. The working machine according to claim 9, wherein both motors are directly connected to their respective axles.

11. The working machine according to claim 8, wherein the low speed motor comprises a reduction gear.

12. The working machine according to claim 1, further comprising a second low pressure pump driven by the prime mover for providing hydraulic fluid for further working machine functions.

13. The working machine according to claim 12, wherein the drive to the first and second pumps is in series.

14. The working machine according to claim 12, wherein the drive to the first and second pumps is in parallel.

15. The working machine according to claim 1, wherein the body comprises an undercarriage and a superstructure rotatable thereon.

16. The working machine according to claim 15, wherein the prime mover, first hydraulic pump and first and second hydraulic motors are mounted in the undercarriage.

17. The working machine according to claim 1, wherein the prime mover is mounted in a transverse direction to a fore-aft direction of the working machine.

18. A method of operating a working machine according to claim 1, comprising the steps of: causing the transmission to enter the second mode of operation and operating the foot throttle to reposition the machine.

19. The working machine according to claim 1, wherein the predetermined criterion is an input from the hand throttle above a predetermined level.

20. The working machine according to claim 1, wherein in the second mode only the hand throttle is able to adjust the engine speed.

\* \* \* \* \*